Jan. 14, 1947.  R. E. BARCLAY  2,414,081
TOASTER
Filed Sept. 7, 1944  4 Sheets-Sheet 2
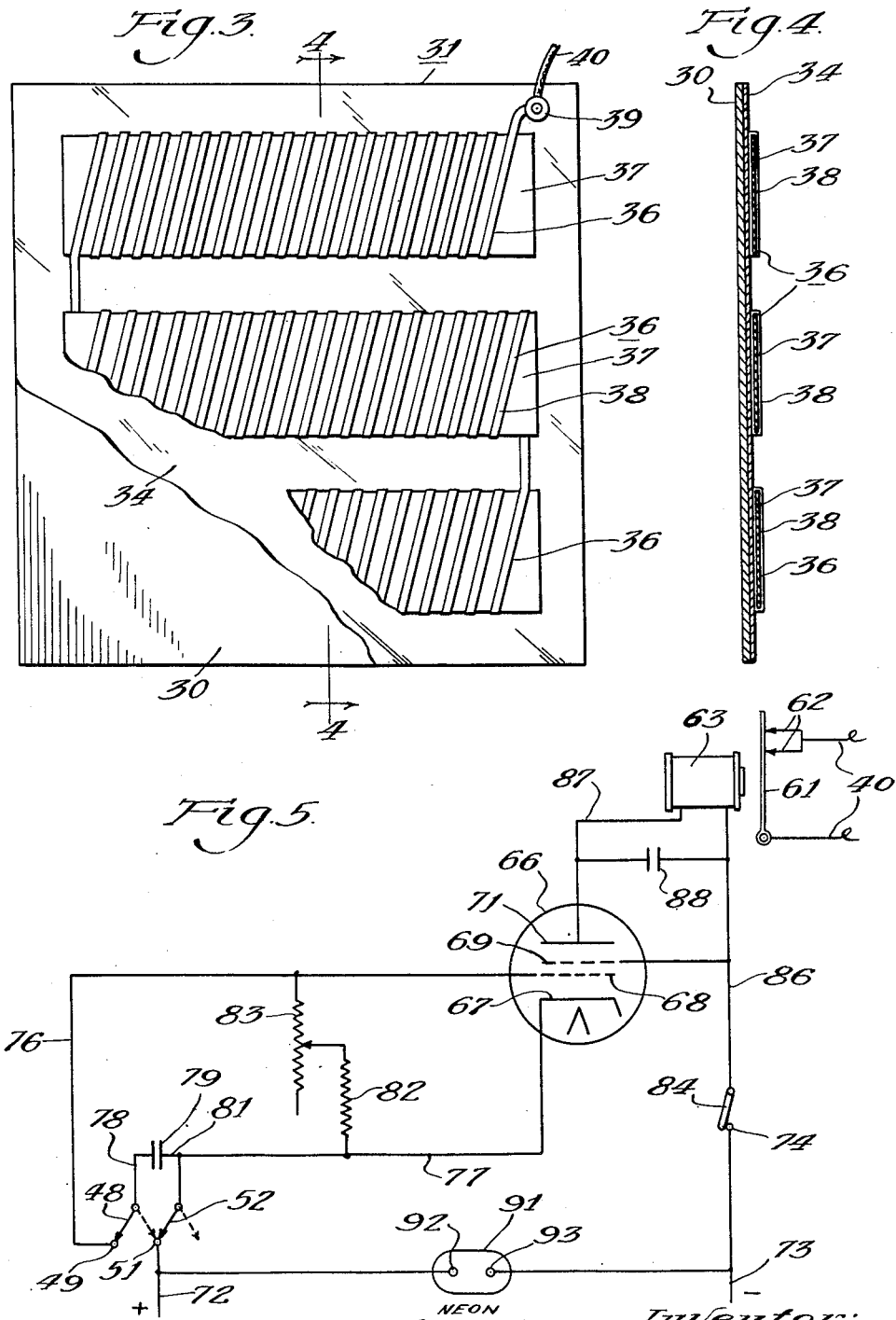

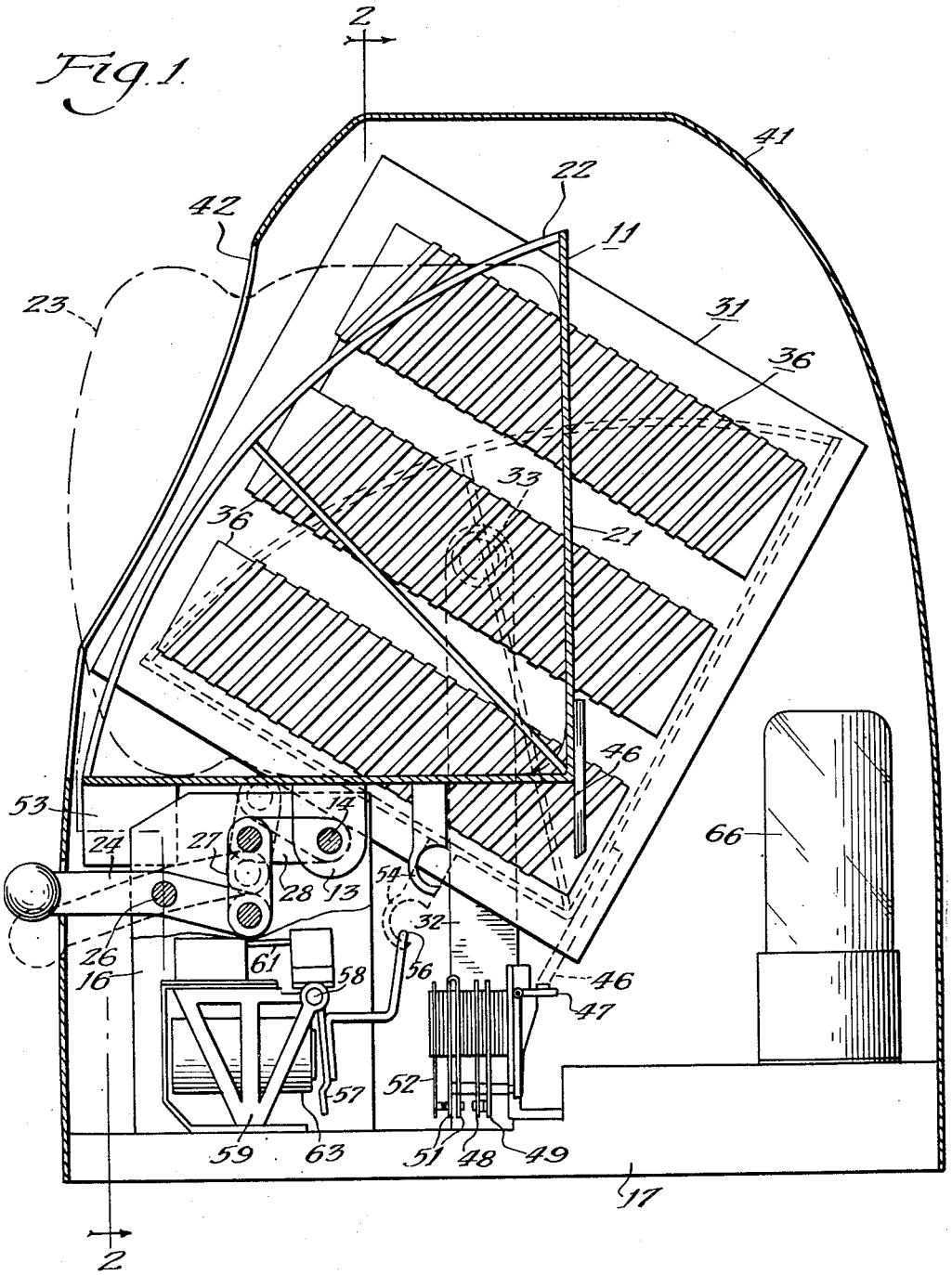

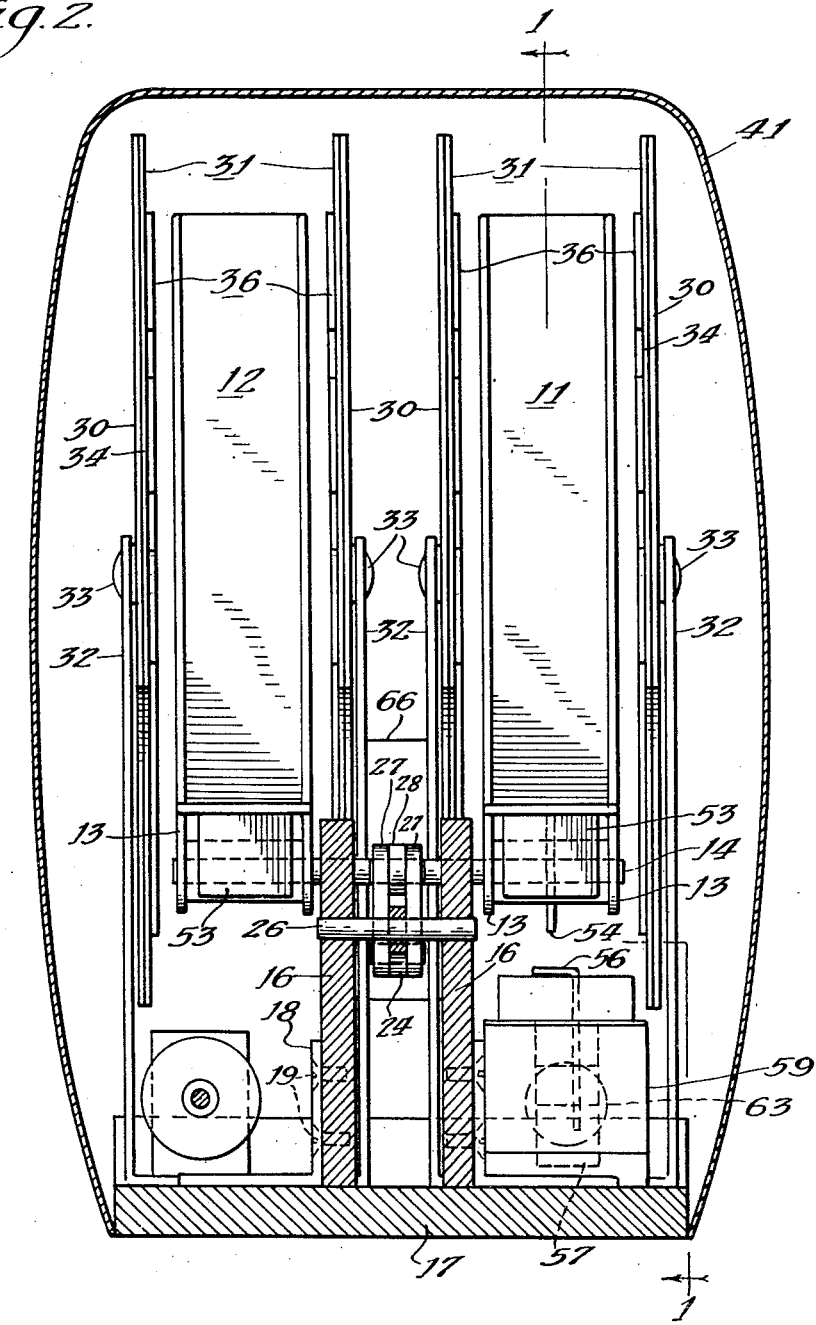

Patented Jan. 14, 1947

2,414,081

UNITED STATES PATENT OFFICE 2,414,081

TOASTER

Robert E. Barclay, Chicago, Ill., assignor to Federal Electric Company, Inc., Chicago, Ill., a corporation of New York Application September 7, 1944, Serial No. 552,971

3 Claims. (Cl. 99—327)

This invention relates to toasters, and is more particularly concerned with toasters embodying toast carriers movable from a loading position to a toasting position by manual operative means and automatically movable from their toasting positions to their loading positions after a predetermined interval of time.

It is an object of the present invention to provide a toaster embodying improved means for controlling the interval of time during which the toast carriers are maintained in their toasting positions. It is a further object of this invention to provide a toaster embodying improved heater units for directing heat against toast carried by the toast carriers when same are disposed in their toasting positions.

A further object of this invention is to provide means for automatically disconnecting the heaters from a source of current upon movement of the toast carriers from their toasting positions to their loading positions.

Another object of this invention resides in the provision of an improved toast carrier and improved means for actuating same between its loading and toasting position.

A further object of this invention is to provide improved heater units embodying reflector plates by means of which heat may be reflected from heat receiving elements toward the toast carrier.

Another object of this invention is to provide a toast carrier movable between toasting and loading positions without the use of springs. In the present invention the toast carrier is movable by manual operative means from a loading position to a toasting position and is automatically returned to its loading position by means of counterweights preferably mounted thereon.

It is a further object of this invention to provide an improved electric circuit for controlling the operation of the heater elements and the relays of the toast carriers from their toasting position to their loading position. The present invention contemplates the use of an electronic discharge device included in the circuit with a capacitance and a variable resistance unit, in which a negative potential is impressed on the grid of the electric discharge device for maintaining same non-conducting for a predetermined interval of time.

This invention further contemplates the provision of an electric control circuit which is operable with either alternating or direct current for releasing the toast carriers from their toasting positions and disconnecting the heating elements from the source of current. In the use of the toaster with direct current, it is necessary in the use of the circuit employed therewith to take into consideration the polarity of the current, therefore, a neon glow lamp is included in the electrical circuit for indicating to the user the polarity of the current.

This invention embodies other novel features, details of construction and arrangement of parts which are hereinafter set forth in the specification and claims and illustrated in the accompanying drawings wherein:

Fig. 1 is a sectional view taken along the line 1—1 of Fig. 2 showing the toaster embodying features of this invention.

Fig. 2 is a sectional view taken along the line 2—2 of Fig. 1.

Fig. 3 is a detailed side elevational view showing a heater unit.

Fig. 4 is a sectional view of same taken along the line 4—4 of Fig. 3.

Fig. 5 shows the electrical timing circuit employed for controlling the movement of the toast carriers and the operation of the heating units.

Figure 6:
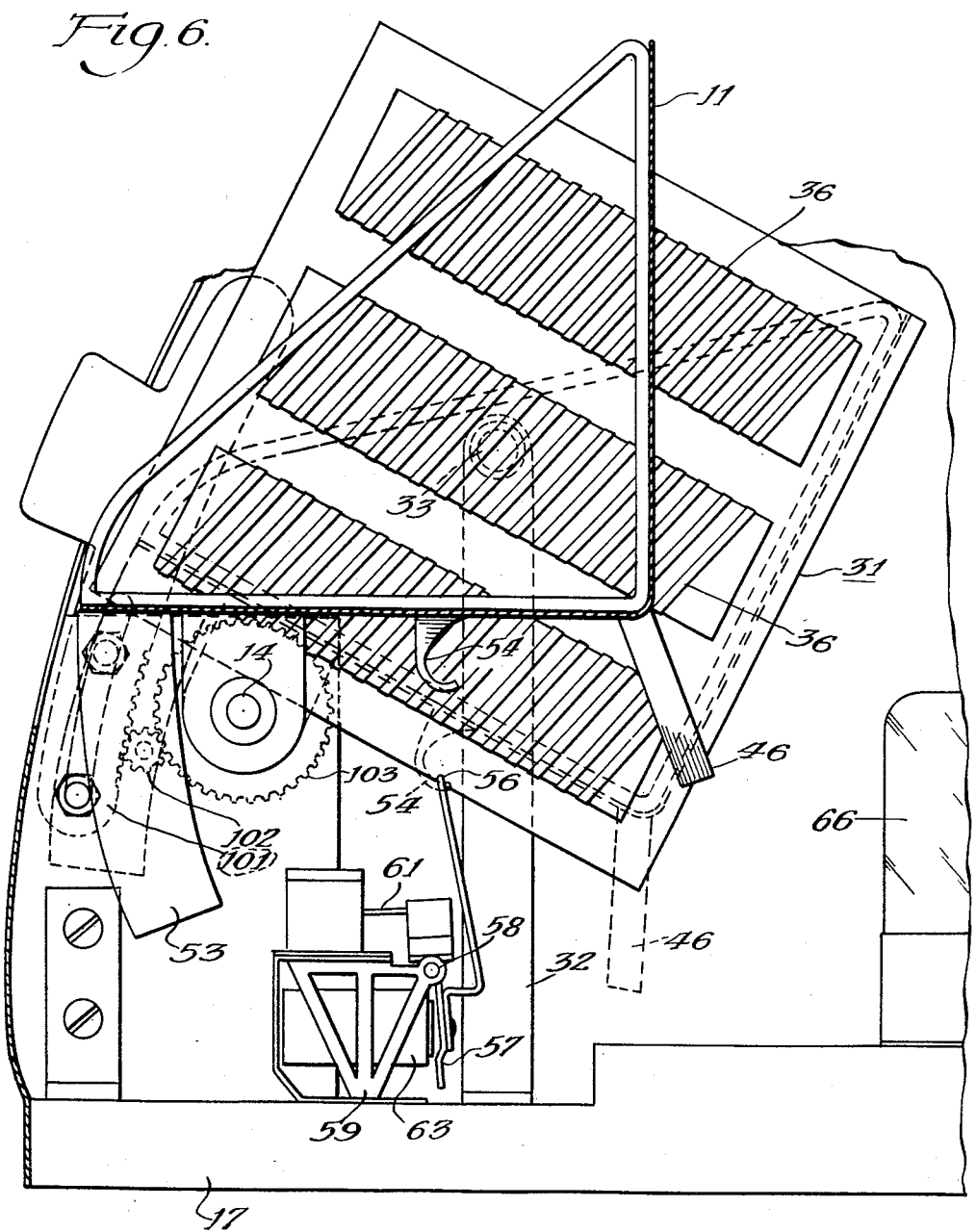
Fig. 6 is a fragmentary sectional view showing a modified form of this invention in which the toast carrier is actuated by means of a rack and a pair of gears.

Referring now to the drawings for a better understanding of this invention, a toaster is shown as comprising a pair of toast carriers 11 and 12 provided with ears 13 for engagement on a cross shaft 14. The shaft 14 is journaled in a pair of bearings 16 which in turn are secured to a base 17 by means of angle brackets 18 and screws 19.

Each toast carrier comprises an angle shaped plate 21 and side rail wire members 22 for holding a slice of toast indicated at 23 against lateral displacement from the toast carrier. The toast carriers are pivotally movable for joint movement from a loading position to a toasting position, as indicated in Fig. 1, by means of an operating lever 24 which is journaled on a pin 26 and acts through connecting links 27 and a lever 28.

A pair of heater units 31 are provided for each toast carrier and are supported on the base 17 by means of supporting brackets 32 and rivets 33. Each heater unit comprises a reflector plate 30 formed of metal and chromium plated to receive a sheet of mica 34 and a plurality of heating elements 36. Each heating element comprises a rectangular sheet of mica 37 having a resistance wire 38 wound thereon, said wires being connected in a series and leading to suitable terminals 39 for connection through leads 40 to a source of current.

A suitable housing 41 is mounted on the base 17 and formed with a pair of openings 42 in the front face thereof through which slices of toast may be inserted for positioning on the toast carriers 11 and 12.

The toast carriers 11 and 12 are movable from their loading positions to their toasting positions by downward movement of the free end of the operating lever 24 which acts through the connecting links 27 and lever 28 to pivot the shaft 14. As the toast carriers approach their toasting positions, a switch actuating arm 46 provided on the toast carrier 11 acts against a bell crank lever 47 to move the switch 48 out of contact with the terminal 49 and into contact with the terminal 51 and also to move the switch 52 out of contact with the terminal 51. After the pressure is removed from the free end of the operating lever 24, the toast carriers 11 and 12 are adapted to move a short distance towards their loading position due to the action of the counterweights 53 provided on the forward ends of the toast carriers. This movement of the toast carriers toward their loading positions permits the switches 48 and 52 to move back into contact with their respective terminals 49 and 51. Further movement of the toast carriers 11 and 12 toward their loading positions is prevented by means of a latch 54 which engages under an abutment shoulder 56 provided on an armature 57. The armature 57 is pivotally connected at 58 to a supporting bracket 59 and carriers a switch 61 for movement into and out of contact with a pair of terminals 62. The switch 61 is normally in engagement with the terminals 62 and is adapted to be moved out of engagement therewith to break the circuit through the leads 40 by energization of the relay 63. When the relay 63 is energized it acts to pivot the armature 57 towards same, thereby moving the switch 61 out of contact with the terminals 62 and also moving the abutment shoulder 56 out of engagement with the latch 54. The circuit 40 to the heating units 31 is thus broken, and the toast carriers are unlatched and free to move from their toasting positions to their loading positions.

The improved circuit for energizing the relay 63 includes an electric discharge device 66 and preferably a high vacuum tube having a cathode 67, a control grid 68, a screen grid 69 and an anode 71. A pair of leads 72 and 73 are employed to direct either alternating or direct current to the terminals 51 and 74 respectively. The terminal 49 is connected to the control grid 68 by lead 76, and the terminal 51 leads through switch 52 and lead 77 to the cathode 67. A lead 78 extends from the switch 48 to one side of the capacitance 79, and the other side of the capacitance is connected by a lead 81 to the lead 77. A fixed resistance 82 and a variable resistance 83 are connected in a series between the leads 76 and 77. A switch 84 leads from the terminal 74 through a lead 86 to the screen grid 69 and relay 63, and the relay is also connected to the anode 71 by means of a lead 87. If desired a capacitance 88 may be connected across the winding of the relay 63.

In the operation of the device thus described, toast carriers 11 and 12 are moved from their loading positions to their toasting positions by moving the free end of the operating lever 24 downwardly. During this movement the switch operating arm 46 acts through the bell crank lever 47 to move the switch arms 48 and 52 out of contact with their respective terminals 49 and 51. The switch 48 is thus moved into contact with the terminal 51 to charge the capacitance 79. A portion of the negative charge of the capacitance 79 is accumulated on the plates thereof by virtue of the anode and screen grid rectification current which flows between the cathode 67 and the anode and screen grid. The condenser 79 prevents flow of sufficient anode current to actuate relay 63. When the operator's hand is removed from the operating lever 24, the toast carrier moved a short distance towards its loading position until engaged against further movement by the latch 54 and the shoulder 56 of the armature 57. This movement is sufficient to permit the switches 48 and 52 to again move into engagement with their respective terminals 49 and 51. Upon return of the switches 48 and 52 to their normal positions in which contact is made with the terminals 49 and 51 respectively, the electric discharge device 66 will not conduct current for a predetermined interval of time established by the constants of the circuit. The length or duration of the minimum and maximum time delay intervals depends upon a number of factors, the principal ones being the value of the capacitance 79 and the value of the resistances 82 and 83. The electric discharge device 66 is maintained non-conducting for a predetermined interval of time due to the negative voltage impressed on the grid 68 by virtue of the charge of the capacitance 79.

Immediately after the closure of switches 48 and 52 and for a predetermined interval of time thereafter, depending upon the setting of the system, the negative uni-directional component provided by the pre-charge of the capacitance 79 predominates and therefore maintains the electric discharge device 66 non-conducting. This negative uni-directional component of voltage produced by capacitance 79 immediately begins to decrease in magnitude upon return of the switches 48 and 52 to their normal positions indicated in Fig. 5. After a predetermined interval of time the negative potential of the grid 68 becomes sufficiently low with respect to the cathode of the discharge device 66 that the device conducts sufficient current to operate. The relay 63 thus acts to open the circuit 40 a predetermined interval of time after movement of the switches 48 and 52 to their positions indicated in Fig. 5 of the drawings. The energization of the relay 63 also actuates the armature 57 to move the abutment shoulder 56 out of engagement with the latch 54, thus permitting the counterweights 53 to pivot the toast carriers 11 and 12 back to their loading positions.

As the timing circuit thus described is operative with either alternating or direct current, a neon glow lamp 91 is connected between the leads 72 and 73 to indicate to the user the proper positioning of a connecting plug with a socket (not shown). When the device is used with alternating current both elements 92 and 93 of the lamp 91 are adapted to be illuminated by the current passing therethrough, however, when the device is employed with direct current only one of the elements, 92 or 93, will become illuminated depending upon the polarity of the current. In order that the electric circuit may be operative with direct current, it is essential that proper polarity is provided, in which event the element 92 will be be illuminated and the user will be advised by means of instructions printed upon the toaster that a proper connection has been made between the plug and the outlet.

The interval of time during which the toast carriers 11 and 12 are held in their toasting positions may be varied by adjustment of the variable resistance 83.

Fig. 6 shows a modified form of this invention in which the toast carriers 11 and 12 are pivoted from their loading positions to their toasting positions by means of an operating rack 101 which acts through an intermediate gear 102 to rotate a gear 103 secured to the toast carrier shaft 14. This form of the invention is otherwise similar to the form heretofore shown and described.

In the use of a toaster of the type thus described, it will be observed that the toast carriers and the actuating means therefor are relatively simple in operation, inexpensive in construction and will not readily get out of order. Further, that the use of chromium plated reflector plates with the heating elements 38 serves to radiate the heat towards the toast carrier and are adapted to conserve electrical energy and to facilitate the toasting operation.

By means of the electrical circuit employed with the toaster, the bread may be suitably toasted for a predetermined interval of time to suit the requirements of the operator by merely turning a control knob for adjusting the variable resistance 83. Due to the fact that alternating and direct current are both commonly employed, it is essential to provide a circuit adapted for use with either type of current, and while this circuit is adapted for use with toasters, it is contemplated that it may be employed for use with devices other than toasters for operating a relay, solenoid or the like.

While this invention has been shown in but two forms, it is obvious to those skilled in the art that it is not so limited but is susceptible of various changes and modifications without departing from the spirit thereof or the scope of the appended claims.

I claim as my invention:

1. In a toaster, a toast carrier movable between a toasting and a non-toasting position, heating elements for directing heat against material to be toasted in said toast carrier when the latter is in said toasting position, control means in said toaster for holding said carrier in toasting position and causing movement of said carrier to non-toasting position after a predetermined time interval, said toasting means including an electron tube having an anode, a cathode and a control grid, a control circuit including an anode-cathode circuit having conductors for connecting said tube to a source of electric power, a condenser in said control circuit for controlling the potential of said grid relative to said cathode in accordance with the charge on said condenser to thereby control the current flow in said anode-cathode circuit, means responsive to manual movement of said toast carrier to toasting position for charging said condenser to a predetermined value at the beginning of a toasting operation, a resistor connected across said condenser to thereafter gradually decrease the charge on said condenser and thereby control said current flow, and means responsive to current flow in said anode-cathode circuit for energizing said heating elements when said condenser is charged to said predetermined value and for deenergizing said heating elements and causing said toast carrier to move to non-toasting position when the charge on said condenser decreases to another predetermined value.

2. In a toaster, a toast carrier movable between toasting and non-toasting position, heating elements for directing heat against material to be toasted in said toast carrier when the latter is in toasting position, means urging said carrier to non-toasting position, holding means for holding said carrier in toasting position, control means for releasing said holding means a predetermined time after said toast carrier has been manually moved to toasting position, said control means including an electron tube having an anode, a cathode and a control grid, an amode-cathode circuit having conductors for connecting said tube to a source of electric power, a condenser normally connected between said cathode and said grid, switch means actuated by movement of said toast carrier to toasting position for momentarily connecting said condenser in series in said anode-cathode circuit to charge said condenser and then reconnect said condenser between said cathode and grid to impress a negative potential on said grid relative to said cathode, a resistor connected across said condenser to provide for gradual decrease of said charge, and means responsive to current flow in said anode-cathode circuit due to decrease in said charge for releasing said holding means after a predetermined time interval.

3. In a toaster, a toast carrier movable between toasting and non-toasting position, heating elements for directing heat against material to be toasted in said toast carrier when the latter is in toasting position, means urging said carrier to non-toasting position, holding means for holding said carrier in toasting position, control means for releasing said holding means a predetermined time after said toast carrier has been manually moved to toasting position, said control means including an electron tube having an anode, a cathode and a control grid, an anode-cathode circuit having conductors for connecting said tube to a source of electric power, a condenser normally connected between said cathode and said grid, switch means actuated by movement of said toast carrier to toasting position for momentarily connecting said condenser in series in said anode-cathode circuit to charge said condenser and then reconnecting said condenser between said cathode and grid to impress a negative potential on said grid relative to said cathode, a resistor connected across said condenser to provide for gradual decrease of said charge, and means responsive to current flow in said anode-cathode circuit due to decrease in said charge for releasing said holding means after a predetermined time interval, said resistor being variable to vary said predetermined time interval, and said toaster having a glow lamp connected between said conductors to indicate when said toaster is connected to a direct current source with the correct polarity for the operation of said control means.

ROBERT E. BARCLAY.